United States Patent [19]

Erwin, Jr.

[11] 4,073,186
[45] Feb. 14, 1978

[54] FLOW METER AND METERING SYSTEMS

[76] Inventor: Curtis L. Erwin, Jr., 5805 SE. Gladstone, Portland, Oreg. 97206

[21] Appl. No.: 737,485

[22] Filed: Nov. 1, 1976

[51] Int. Cl.² ............................................. G01F 9/02
[52] U.S. Cl. .................................... 73/114; 73/119 A
[58] Field of Search ..................... 73/114, 113, 194 E, 73/239, 244, 119 A

[56] References Cited

U.S. PATENT DOCUMENTS

| 3,192,769 | 7/1965 | Blakeman | 73/251 |
| 3,714,823 | 2/1973 | Wilkens et al. | 73/113 |
| 4,007,634 | 2/1977 | Alban | 73/114 |

FOREIGN PATENT DOCUMENTS

| 1,955,326 | 5/1971 | Germany | 73/114 |

*Primary Examiner*—Jerry W. Myracle
*Attorney, Agent, or Firm*—Eugene M. Eckelman

[57] ABSTRACT

A meter housing including internal metering apparatus movable by fuel flowing through the housing. The metering apparatus in its driven function operates in a rotating, reciprocating or wobbling manner, and with its operation moves a permanent type magnet. The magnet is associated with a sensing device in an electrical circuit which senses the moving functions of the magnet and transmits operating cycles to a pulse receiver in the electrical circuit which in turn operates selected types of counters or read-out devices such as digital tachometers, totalizing counters, re-set counters, or the like. Importantly, the magnet is a part of the metering apparatus operating in the fluid compartment of the housing and the sensing device is disposed in another compartment in the housing close enough for influence by the magnet but completely isolated from the fuel by a fluid impervious wall, thus preventing any possibility of explosion. Also importantly, the sensing device and other components in the circuit are solid state electronic components which will withstand rugged treatment. Temperature compensating elements are employed in the measuring system. The metering apparatus can be used with various types of combustion systems, such as gas engines, Diesel engines, and various other combustion apparatuses. Furthermore, the meter may be associated with vehicles to show off-highway fuel consumption. Various types of rate designations such as gallons per hour, miles per gallon, revolutions per gallon, and other functions may also be employed. Also, an alternative form of metering apparatus is employed that meters extremely small increments to accomplish sensitive readouts.

50 Claims, 20 Drawing Figures

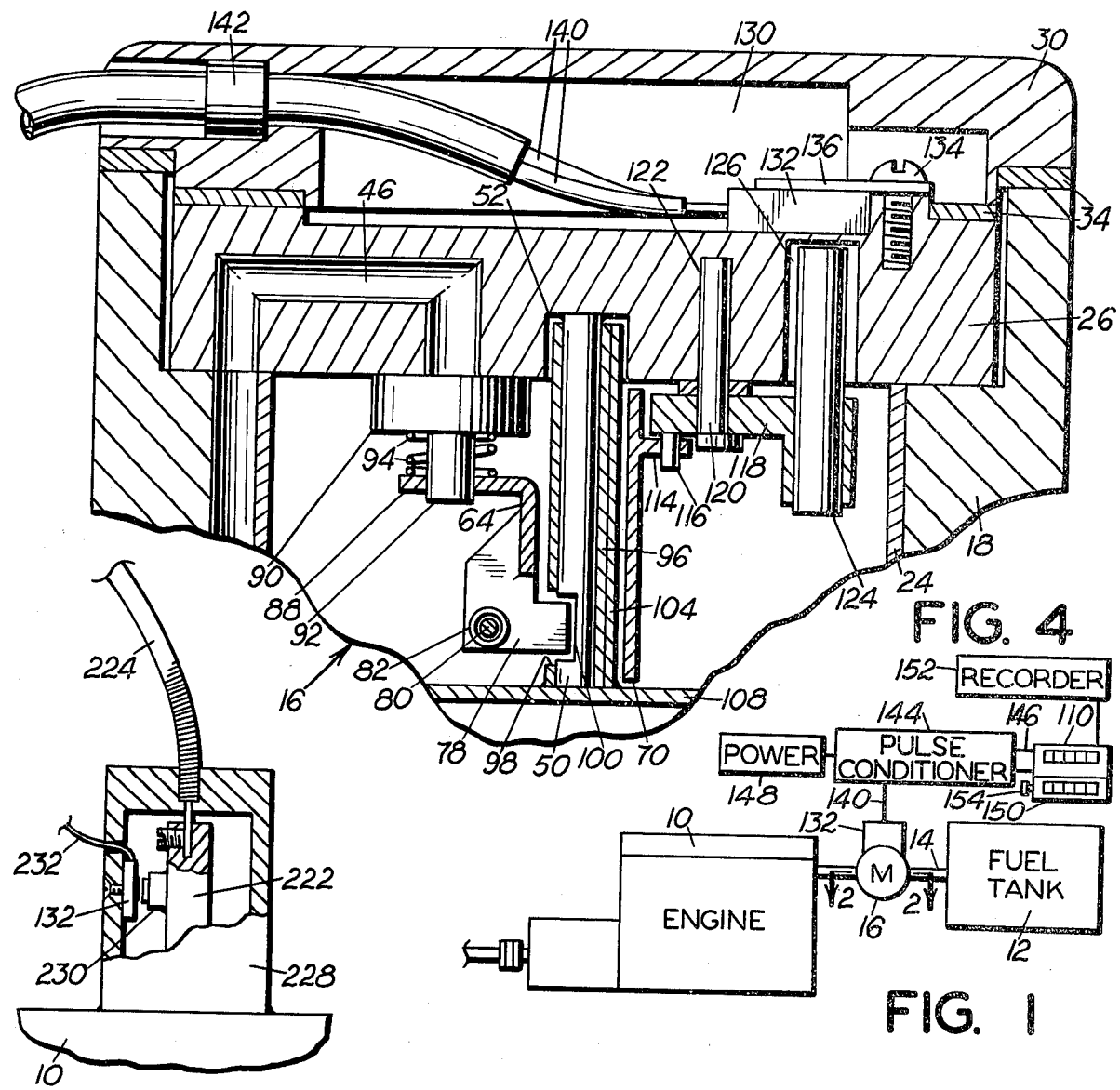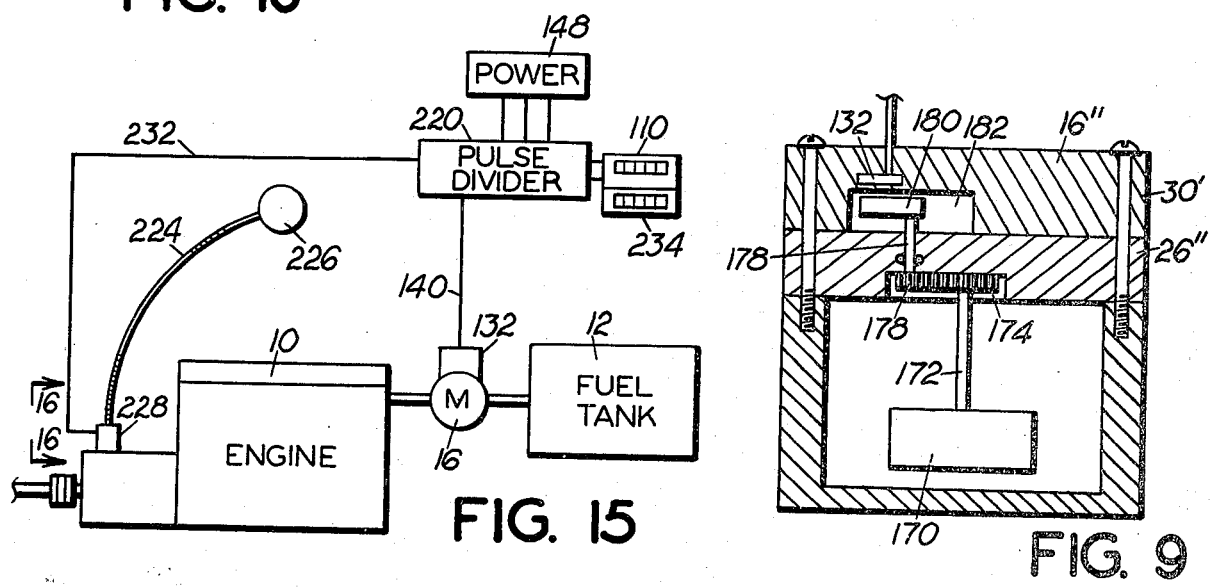

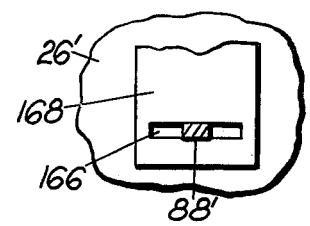
FIG. 8
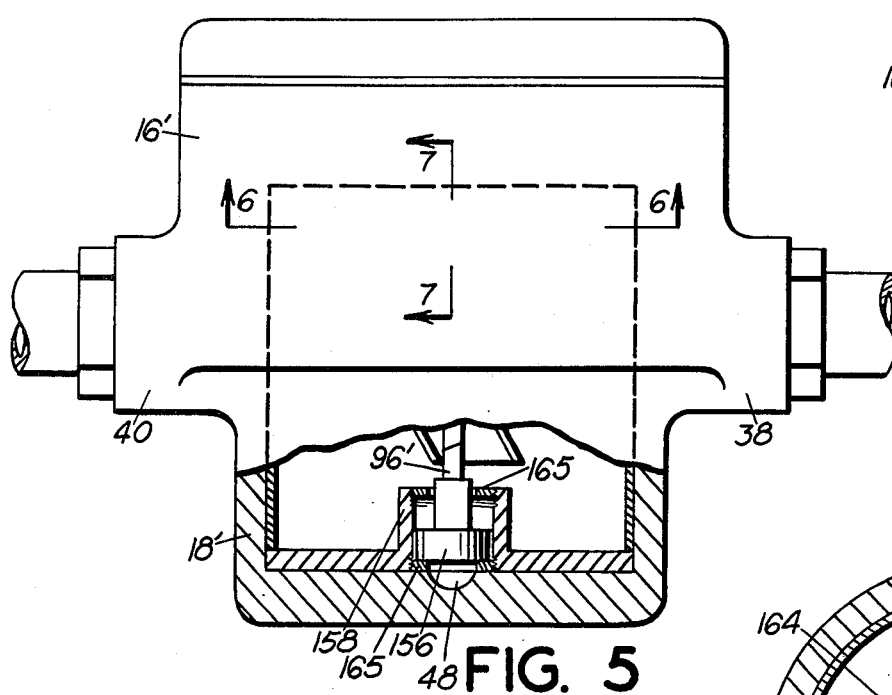
FIG. 5
FIG. 6
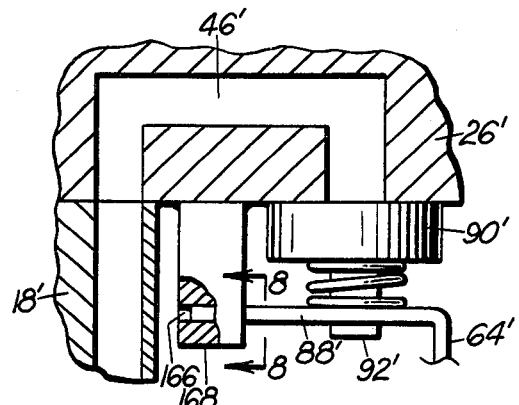
FIG. 7
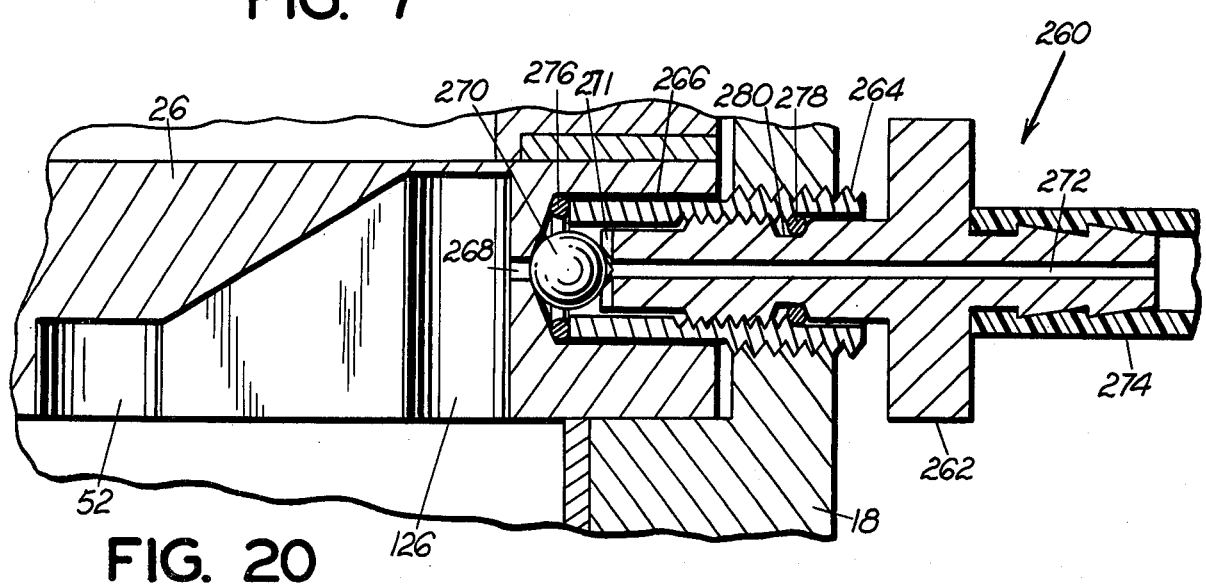
FIG. 20

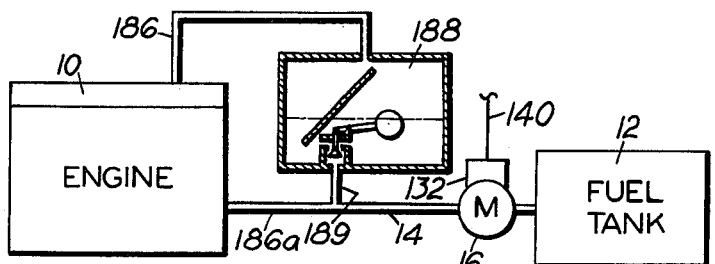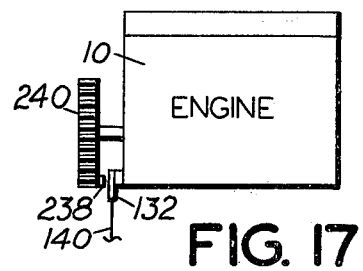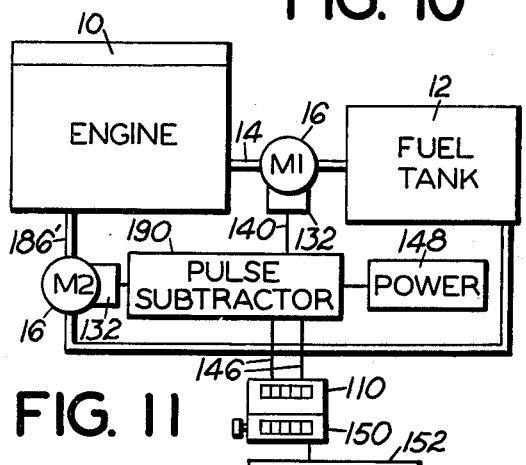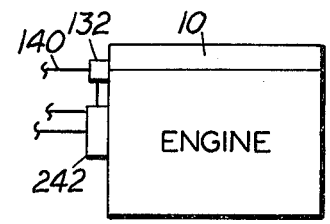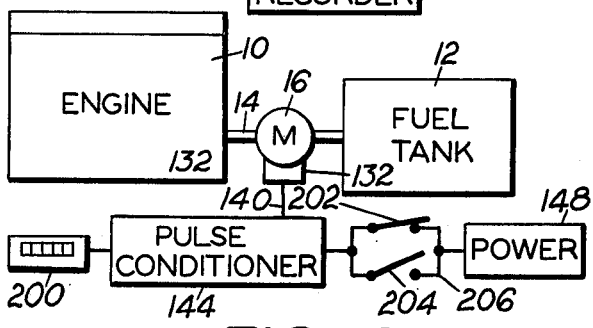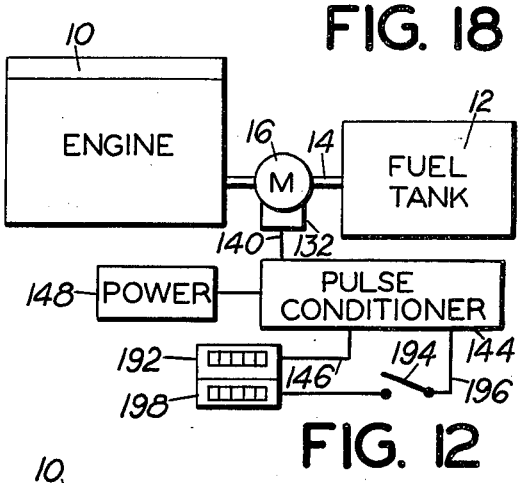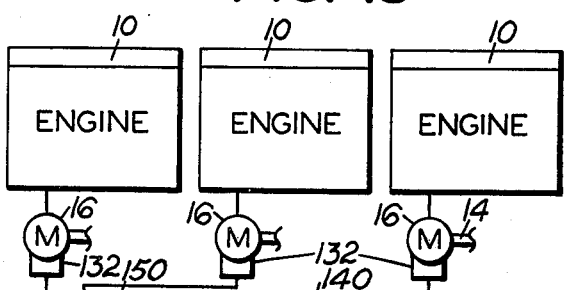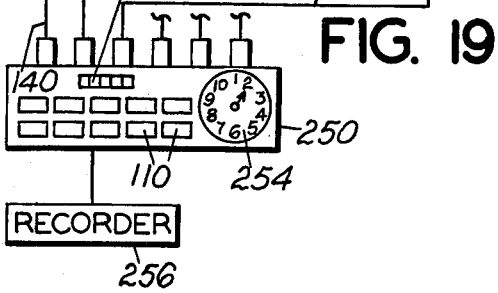

FLOW METER AND METERING SYSTEMS

BACKGROUND OF THE INVENTION

This invention relates to new and useful improvements in engine fuel meters and systems employed therewith.

In my prior U.S. Pat. Nos. 3,805,602 and 3,949,602 I provided structure for efficiently determining engine conditions by directly ascertaining the amount of fuel consumed by the engine. These prior systems utilized novel meter and read-out means to accomplish the intended purpose wherein operators not only watching the read-out can operate the engine in an efficient manner but also they are capable of examining fuel consumption directly to test the condition of the engine. This type of system has important advantages over other types of engine tests, such as dynamometers, because an accurate knowledge of fuel consumption based on a particular load gives a direct indication, whereas in the dynamometer tests and other tests, too many variables are present to give a completely accurate test.

SUMMARY OF THE INVENTION

It is a primary objective of the present invention to provide important improvements over my prior structures to even more accurately and reliably meter fuel consumption of internal combustion engines as well as to adapt metering means to various types of systems.

To contribute to the above objectives, an engine fuel meter is provided in which magnetically actuating means is operated in cyclic movement by metering means in the housing, and fuel consumption indicating means is driven by said magnetically actuating means. In addition, the parts are arranged such that the fuel oprated metering means and magnetically actuating means are isolated from electric components, thus eliminating any possibility of the fuel being ignited by the electrical operating means of the meter. Further yet, the electrical components are solid state electronic components which due to their absence of movable or fragile parts are rugged in operation, making the apparatus reliable for use on vehicles.

It is another object of the present invention to provide means in the system capable of measuring very small units of fuel, and for this purpose a meter construction employs a small diameter plunger having rapid cycling and substantially friction free movement for accomplishing a sensitive type measuring.

The present engine fuel metering system also is capable of combination with totalizer type counters and furthermore is particularly adaptable for use with tax metering systems wherein off-road type metering of fuel consumption is accomplished. Further yet, the present system may be combined with various other operative portions of a vehicle, such as the drive shaft, brakes etc. to designate various read-out values, and can be used in tests for multiple engine arrangements.

The invention will be better understood and additional objects and advantages will become apparent from the following description taken in connection with the accompanying drawings which illustrate preferred forms of the systems.

BRIEF DESCRIPTION OF THE DRAWINGS

FIG. 1 is a diagrammatic view of an engine metering system embodying a first form of the present invention;

FIG. 4 is a fragmentary vertical sectional view taken on the line 4—4 of FIG. 2;

FIG. 5 is a side elevational view, partly broken away, of a modified form of metering apparatus;

FIG. 6 is a fragmentary horizontal sectional view taken on the line 6—6 of FIG. 5;

FIG. 7 is an enlarged fragmentary sectional view taken on the line 7—7 of FIG. 5;

FIG. 8 is a fragmentary sectional view taken on the line 8—8 of FIG. 7;

FIG. 9 is a sectional view, partly diagrammatic, of a somewhat modified form of metering apparatus;

FIGS. 10 through 15 are diagrammatic views of engine metering systems illustrating other forms of the invention;

FIG. 16 is an enlarged elevational view, partly broken away, taken on the line 16—16 of FIG. 15;

FIGS. 17 through 19 comprise diagrammatic views of still other metering systems of the invention; and FIG. 20 is an enlarged sectional view of air bleeding means that may be used with metering apparatus of the invention, such view being taken on the line 20—20 of FIG. 3.

DETAILED DESCRIPTION OF PREFERRED EMBODIMENTS

Figure 2:
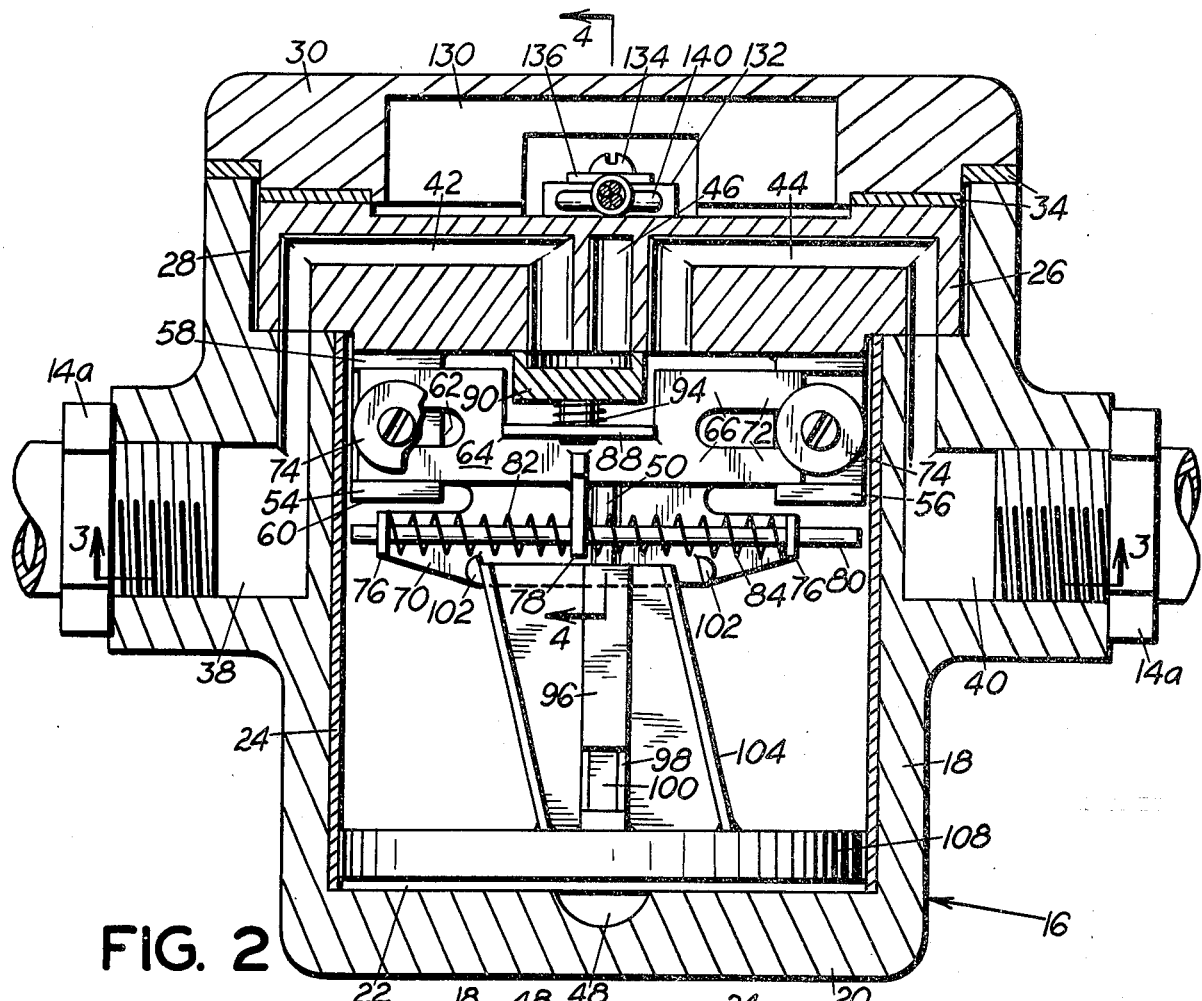
FIG. 2 is an enlarged vertical sectional view of metering apparatus taken on the line 2—2 of FIG. 1.

With particular reference first to the diagrammatic view of FIG. 1, the numeral 10 designates an engine, such as an internal combustion engine, and the numeral 12 designates the fuel tank connected to the engine by a fuel line 14. One form of metering apparatus 16, comprising a slow flow, fluid reversing snap action meter, is contained in the fuel line and is structurally detailed in FIGS. 2, 3 and 4.

Such metering apparatus comprises an outer casing 18 of cylindrical shape and has a bottom wall 20 with stop projections 22 thereon for a piston mechanism to be described. A sleeve 24 is disposed within the casing 18 forming a cylinder. The casing has a head 26 disposed within a counterbore portion 28 thereof, and a cover plate 30 is mounted on top of the casing 18 and removably held thereon as by screws 32 (shown diagrammatically in FIG. 3 since they are out of the plane of the views) which extend through the cover plate and head 26 and threadedly engage the casing. Sealing gaskets 34 are disposed between the cover plate 30 and the casing 18 as well as between the cover plate 30 and the head 26, and important to the invention, as will be described, these sealing gaskets positively seal interior portions of the cover plate from the interior of the casing.

The casing 18 has an inlet 38 and an outlet 40 disposed substantially in opposed diametrical relation. The metering apparatus 16 is installed in the fuel line 14 by conventional means such suitable fittings 14a. A passageway 42 in the head 26 leads from the inlet 38 and opens into the interior of the meter casing, and a passageway 44 also in the head leads from the outlet 40 and opens into the interior of the casing in laterally spaced relation to the outlet of passageway 42. A third passageway 46 extends from a point of inlet interiorly of the meter casing which is disposed between the outlet of passageways 42 and 44, and this passageway extends to a side of the head beyond the sleeve 24, best seen in FIG. 3. The head 26 and the outer casing 18 are cut away vertically in the plane of the outer end of the passageway 46 to provide a vertical passageway 48. This latter passageway establishes communication between the passageway 46 and the bottom of the casing. It will thus be seen that the passageway 42 leads from the inlet 38 to the top of the interior of the casing, the passageway 46 leads from this same top region to the bottom of the casing, and the passageway 44 leads from the interior of the casing to the outlet of the metering apparatus.

Metering valve mechanism, FIGS. 2–4, will now be described which is driven by fuel flow and which causes such fuel to flow alternately to the upper and lower cylinder regions and be exhausted through the outlet 40. The head 26 has a depending, round center guide post 50 projecting into the casing at about the center thereof. This post projects integrally from the upper wall of a recess 52 cut in the lower surface of the head 26. Also depending from the head 26 but at opposite sides of the casing are two guide posts 54 and 56, and each of these posts is formed with upper and lower flanges 58 and 60, respectively, and a central horizontal projection 62 on each side thereof, the flanges 58 and 60 forming horizontal slots with the projection 62 which function as guide slots. Such guide slots are formed on both sides of the posts, namely, the front and rear, the front being considered that portion facing the viewer in FIG. 2.

The two posts 54 and 56 slidably support a valve support plate 64 on the front side thereof. Valve support plate 64 has a pair of arms 66 on each end slidably received within the slots formed on the front side of the respective posts 54 and 56, the valve support plate and its arms being of selected dimension so as to be reciprocatable laterally a short distance within the casing. The posts similarly mount a loader plate or slide 70 on the other or rear side thereof. This plate has spaced end arms 72 received in a similar fashion in the post slots as the arms 66 of valve support plate 64 on the other side, the loader plate and its arm also being dimensioned so as to be laterally reciprocatable a short distance. Washers 74 are provided at the front and rear of the support posts and are held in place by suitable bolts to maintain the plates 64 and 70 within their particular slots of the posts. The loader plate 70 has two spaced arms 76 which project substantially at right angles from the body of the plate in a forward direction beyond and below the body of the valve support plate 64.

Attached to the portion of the valve support plate 64 between the arms on the loader plate 70 is a trip element 78 projecting both to the front and rear of the valve support plate in parallel relation with the arms 76. A horizontal shaft 80 is supported between the arms 76 and also passes slidably through the trip element 78. A first compression spring 82 is supported on the shaft 80 between the trip element 78 and one arm 76 of the loader plate and a second compression spring 84 is supported on the shaft 80 between the trip element and the other arm 76.

Valve support plate 64 has a forwardly extending right angle drive finger or tab 88 disposed below the region of the outlets of the three passageways 42, 44 and 46 into the casing, and mounted on such drive finger is an inverted cup valve 90 having a depending stem 92 freely received within an opening provided therefor in the drive finger 88. A compression spring 94 is disposed between the drive finger 88 and the cup valve 90 about the stem and holds the valve firmly but slidably against the underside of the head 26. As illustrated, the valve diameter is such that its hollow recess portion bridges at one time both the outets from passageways 44 and 46 or alternatively both the outlets from passageways 42 and 46, depending upon the position of the valve in two limit positions.

Slidably fitted on the post 50 is a piston rod 96. This piston rod has a box-like shape which provides the slidable connection on the post. Piston rod 96 has a lower transversely extending cutout portion 98 and post 50 has a cutout portion 100 which as will be more apparent hereinafter is adapted for lateral alignment with the cutout portion 98 in a down position of the piston rod.

Loader plate 70 has a pair of forwardly extending projections 102 between which an angled cam body 104 integral with the piston rod 96 slidably operates. By this arrangement, upon up and down movement of the piston rod, the cam body 104 will cam the loader plate first to one side and then to the other. Such movement of the loader plate in one direction compresses the spring 82 between one of the arms 76 and the trip element 78 and in the other direction compresses the other spring 84 between the other arm 76 and the trip element 78.

Integrally connected to the bottom end of the piston rod 96 is a piston head 108 having a liquid tight engagement in a suitable manner at its peripheral edge with the inner wall of the sleeve 24.

With regard to the operation of the metering apparatus 16, reference is made to FIG. 2 wherein the piston 108 is disposed at its lower position and the valve 90 connects the passageway 42 with the passageway 46. Fluid at this time is directed from inlet 42 to the bottom of casing 18 by means of passageways 46 and 48 for driving the piston up. As the piston is driven upwardly, the fluid above it in the casing is discharged through the passageway 44 and out outlet 40. Also, during the upward travel of the piston, the loader plate 70 is caused to be shifted to the right due to the camming action therein by pins 102 on the cam body 104, and this causes the spring 82 to be compressed. The valve support plate 64 is restrained from moving to the right since its trip element 78 is in engagement with the left side of the piston rod 96 in the area above cutout portion 98. Such upward travel of the piston continues with progressive compression of the spring 82 until the bottom cutout portion 98 of the piston rod reaches a height sufficient to allow the trip element 78 to pass therethrough. This releases the valve support plate 64 for quick movement to the right under the action of the loaded spring 82. Since the cup valve 90 moves with the valve support plate, it will then be disposed in a position connecting passageways 44 and 46. Fluid is then introduced to the upper area of the casing through passageway 42 and the piston is driven downwardly, the exhaust flow of the fluid at the bottom of the piston being driven up through the vertical passageway 48 and out the passageway 44 and outlet 40. As the piston moves down, it causes the loader plate 70 to be shifted to the left as seen in FIG. 2 due to the camming action thereof between the cam body 104 and projections 102. This causes the spring 84 to be compressed but the valve support plate 64 is restrained from moving because of engagement of its trip element 78 with the right side of the piston rod 96 in the area above cut-out portion 98. The downward travel of the piston continues until the trip element 78 can pass over the top of the piston rod 96. Movement of such trip element over the piston rod allows the spring 84 to move the valve support plate 64 to the left and cause the fluid to be directed under the piston by means of passageways 42, 46 and 48 to start upward movement of the piston.

In the present system, the movements of the internal workings of the metering apparatus 16 as just described are utilized to operate electrically functioning indicating means 110, FIG. 1. To accomplish such operation, the rear of the loader plate 70 has an ear 114, FIGS. 3 and 4, rotatably receiving a pin 116 depending from one end of an arm 118 pivotally supported on a headed shaft 120 secured in a bore 122 in the undersurface of head 26. The outer end of arm 118 integrally supports a permanent type magnet 124 which projects above the arm and into an arcuate recess 126 on the underside of head 26. The recess 126 terminates close to but short of the upper surface of head 26, and the upper end of the magnet 124 is disposed closely adjacent but clear of the upper end of such recess. Magnet 124 is removably secured in the arm 118 by a setscrew 128, FIG. 3.

As described hereinbefore, the up and down movement of the piston 108 provides reciprocating movement of the loader plate 70, and thus by such reciprocation of the loader plate, it will pivot the arm 118 back and forth for moving the magnet 124 back and forth in the recess in cyclic operation.

Cover plate 30 is recessed at 130 on its undersurface, FIGS. 2 and 4, and disposed in this recess in supported relation on the top of head 26 is a magnetic sensing or pickup device 132. The device 132 is supported directly over the recess 126 approximately centrally between the ends thereof and is secured in place on the head 26 by a screw 134 engageable with an arm 136 on the sensing device 132. The sensing device is located sufficiently close to the magnet for influence thereby.

Suitable wires 140 extend from the sensing device 132 into a plug-in adapter 142 mounted in the cover plate 30, and such wires are electrically connected through the adapter to a pulse conditioner 144, FIG. 1, in turn connected by wires 146 to the indicating means 110. Power is supplied by suitable power supply 148 such as a source of DC or AC.

The specific details of the components consisting of the magnetic sensing device 132, the pulse conditioner 144, the electrically operated indicating means 110 and the circuitry are not illustrated in detail since such components are of known design in the art. Importantly, however, solid state circuitry is utilized in the magnetic sensing device 132, comprising an ISS4 Honeywell chip sensor or Hall effect microswitch and in the pulse conditioner 144 of suitable module form to pick up the pulses from the sensing device and transmit them to the indicating means 110. The use of solid state components provides a system that is rugged in use and will have long life on vehicles even though subjected to severe vibration or shock from the vehicle. The indicating means 110 may comprise an electro-mechanical tachometer or frequency counter having a sufficient number of digits to accomplish the desired read-out. It is to be understood that the indicating means 110 may also comprise solid state digital read-out type means rather than electromechanical. At any rate, the indicating means 110 is calibrated to depict fuel usage such as gallons or pounds per unit of time, and with proper calibration of the indicating means and the metering apparatus, a read-out is available directly on the indicating means of the fuel being consumed by an engine per unit of time to determine accurately the rate of fuel usage. Through proper adjustment of the sensing device 132 along recess 126 by holding screw 134, the said device 132 can be properly centered with relation to the reciprocation of the magnet to insure equal volume of throw of the piston 108 in each direction for accurate operation of the pulse conditioner.

In addition to employing the read-out means 110 showing the rate of fuel consumption, the latter may be associated with a counter 150 that comprises a totalizer driven by the pulse conditioner 144. This portion of the indicating means is advanced by each pulse and calibrated to show total fuel used. It is provided with a reset button 154 for resetting to a reference point is desired.

An electrically driven recorder 152 of well known construction may be operated by the indicating means to make a permanent record of fuel usage either from the rate indicator 110 or totalizer 154 or both.

The present magnetic actuated system as operated by the reciprocating motion of the loader plate 70 provides uniform and smooth functioning of the indicating means 110. In addition, the compartment for the meter apparatus and the magnet is separate from the compartment for the sensing device 132 and seals 34 isolate these two compartments from each other and thus there is no danger of the fuel being ignited. In the placement of the system on an engine or on a vehicle, the indicating means 110 generally is located in the cab for viewing by the operator and of course the metering apparatus is mounted in the engine compartment. All of the electrical components are provided with removable plug-in connections with each other, such as the adapters 142 shown in FIG. 4, and thus customizing to various engines and vehicles is readily carried out.

The particular size and movement of the piston 108 is selectively corrulated so as to produce the pulsing ratio desired. For example, these variables may be corrulated to produce a pulsing ratio of 1/100 of a gallon. With reference to FIG. 5, a form of metering apparatus 16' is employed that is super sensitive. This metering apparatus is similar to the embodiment of FIGS. 1, 2, 3 and 4. It employs the same internal workings except that a miniature piston 156 is utilized and the casing 18' is provided with a correspondingly sized miniature cylinder portion 158. The small piston head 156 is operated reciprocally in the cylinder 158 in the same manner as the piston 108 in FIG. 2 but due to the miniaturization thereof it operates much faster and at shorter movements and is used to increase the pulsing ratio and decrease the rate value of units in the output of the indicating means 110. In other words, as described above, the larger type piston 108 in FIG. 2 may produce a pulsing ratio of 1/100 of a gallon to accomplish for example a rate reading in gallons per hour. In the FIG. 5 embodiment, however, the miniaturized piston and cylinder can produce a pulsing ratio of 1/1000 of a gallon to provide a more sensitive type reading on the indicating means 110.

With particular reference to FIGS. 6, 7 and 8, means are provided in the embodiment of FIG. 5 to reduce friction to a minimum and accomplish efficient operation of a miniaturized piston. For this purpose, the outlets of passageways 42', 44' and 46' through the undersurface of head 26' are made oval in shape, with the lesser or minor axis of the oval extending in the same direction as the direction of movement of cup valve 90'. In view of the reduced dimension of the outlets of passageways 42', 44' and 46' in this one direction, such outlets can be placed substantially close together and the size of the valve 90' can be materially reduced. There is thus a very small amount of friction. Stop pins 162 threadedly supported in projections 164 secured in depending relation to the head 26' provide precise limiting movement of the valve support plate. The limiting movement of the valve is adjustable by selected threaded positioning of stop pins 162 in their projections. To provide extreme accuracy in the throw of the piston 156, upper and lower stop washers 165 are threadedly mounted in the cylinder 158 and are adjustable as necessary. This type of stop means may be used with the embodiment of metering apparatus shown in FIGS. 2-4.

FIGS. 7 and 8 also show structure facilitating improved operation of the valve 90'. In this improved arrangement, the drive finger 88' from the valve support plate 64' is elongated and its free end is slidably engaged in a slot 166 in a guide block 168 depending integrally from the undersurface of head 26' on the side of the valve 90' opposite from plate 64'. The slot 166 is of sufficient length to allow full movement of the finger 88' in the oscillating motion of the valve support plate 64' but at the same time, the finger is confined closely against vertical play in the slot so that that valve 90' is always held flat against the undersurface of the head 26 in its movements.

With reference to FIG. 9, a modified form of metering apparatus 16" is employed illustrating that types of fluid driven means other than the reciprocating type piston may be employed to accomplish the pulsing for driving counter mechanisms. The structure of FIG. 9 is shown somewhat diagrammatically, and in this embodiment a fluid driven member such as a wobble plate assembly 170 of well known construction is employed instead of the reciprocating piston of the type shown in FIG. 2. The assembly 170 rotatably operates an output shaft 172, and this shaft has a gear 174 secured thereon which is in mesh with a gear 176 secured on the bottom end of a shaft 178 passing up through the head 26". The upper end of shaft 178 has a magnet 180 secured thereon and this magnet is disposed in a recess 182 in the bottom surface of the cover plate 30'. A magnetic sensing or pickup device 132 as in FIGS. 1-4 is supported in the cover plate 30'. This electrical pickup means is isolated from the recess 182 and the recess 182 is isolated from the fluid compartment. In the operation of the assembly of FIG. 9, rotation of the output shaft 172 of the wobble plate assembly rotates the magnet 180 in the recess 182. Although not shown, the pickup device 132 is associated with a pulse conditioner and counter mechanism as in FIG. 1, and the rotation of the magnet in its rotating cycles is sensed by the pickup means 132 to operate the pulse conditioner.

With reference to FIG. 10, there is illustrated an arrangement showing that the metering apparatus 16 may be employed with a Diesel engine 12 or other engine of a type in which unburned fuel is returned. In the arrangement of FIG. 10, the unburned fuel is returned through a conduit 186 into the top of a treatment tank 188 in which a fluid level is maintained, such as a tank shown in my U.S. Pat. No. 3,672,394, which may serve several functions such as removing air from the returned fuel, cooling the returned fuel, etc. The outlet 189 from the treatment tank 188 is at the bottom and the fuel line 14 from the fuel tank 12 is joined with this outlet and connected by means of a conduit 186a to the infeed of the engine. The fuel meter 16 is connected into the fuel line 14 and the flow therethrough comprises the actual fuel used. The system of FIG. 10 is adaptable for use with vacuum fuel systems wherein fuel flow can result from the engine vacuum. Although not shown, the meter 16 of FIG. 10 is associated with a pulse conditioner and counter mechanism as in FIG. 1.

FIG. 11 shows an arrangement wherein unburned fuel is also returned from the engine 10, such as in Diesel engines, but this arrangement differs from FIG. 10 in that the return line 186' from the engine leads to the fuel tank rather than back into the fuel line 14. It is clear that the flow of fuel through the fuel line 14 is not the exact amount of fuel being consumed by the engine, but rather the exact amount of fuel consumption is the fuel flow in fuel line 14 minus that which is returned through the conduit 186'. For this purpose, a pair of metering apparatuses 16, designated M1 and M2, are installed, one in the fuel line 14 and the other in the return line 186', respectively. The lead wires 140 from these metering apparatuses lead to a pulse subtractor 190 electrically connected to the indicating means 110. The output of pulse subtractor 190 comprises the difference in the output of the two metering apparatuses 16, and the rate of fuel consumption by the engine is accurately shown on the indicating means 110. A totalizer mechanism 150 may also be employed in the indicating means as in FIG. 1. An electrically driven recorder 152 may be operated by the rate indicator 110 or totalizer or both.

FIG. 12 illustrates a combination of the present metering apparatus 16 with a pressure brake system, such as an air spring brake commonly used on trucks, and such system is particularly useful for metering off-highway use for tax purposes or other uses wherein it is desired that metering be accomplished only when the brake is set. It is to be understood, however, that instead of a brake assembly, as shown on the drawings, the assembly may be used with and actuated by other vehicle means such as a power take-off or the like.

First it is seen in the arrangement of FIG. 12 that the metering apparatus 16 operates through a pulse conditioner 144 as in FIG. 1. The pulse conditioner 144 in this embodiment, however, operates a counter 192 which totalizes units of fuel used. The numeral 194 designates a switch which is closed only when the brake that sets the vehicle, or a power takeoff, is actuated. Such switch is in wiring 196 between the pulse divider 144 and a counter 198. In the operation of the system of FIG. 12, the counter 192 is in operation as long as the engine is running but the counter 198 is in operation only when the switch 194 is closed to totalize fuel consumption when the brake is set the vehicle or the power take-off is actuated.

With reference to FIG. 13, metering apparatus 16 is used with a pulse conditioner 144 and a counter 200 in combination with a vehicle which employs two set of brakes of the type wherein one set of brakes is normally non-activated and requires pressure to apply it and the other set of brakes is normally applied and requires pressure to deactivate it. These brakes are disposed in a vehicle pressure system of well known arrangement. The counter 200 is arranged to register fuel when either brake is set, regardless of which one, and such counter finds important usage in registering fuel used for tax purposes. In the system of FIG. 13, two switches 202 and 204 are employed and each comprises a pressure switch associated with a respective brake system such that it is closed when its brake is set. That is, the two switches are connected to power 148 through a branch circuit 206 and to the pulse conditioner 144. Since one switch will always be closed, the counter 200 will be in operation at all times that the vehicle engine is running.

In the arrangement shown in FIG. 14 metering apparatus 16 is used with a pulse conditioner 144 and a counter 210 which is operated by pulses from the pulse conditioner to give rate of fuel usage. In this arrangement, however, the counter 210 is associated with a microprocessing chip 212 having electrical connection by wiring 214 with a probe such as a thermocouple 216 which senses the temperature of the fuel in meter 16. By suitable operative relationship and control by the microprocessing chip on the counter 210 in circuitry of conventional design, as determined by the temperature of the fuel, the counter will accurately measure the mass of the fuel being consumed by the engine. Thus, an accurate read-out from the counter 210 can be in units of weight per unit of time such as pounds per hour.

The system of FIGS. 15 and 16, as one feature thereof, combines fuel usage per unit of time or other rate unit with the rotation of an output shaft and displays a resultant reading of fuel usage based on revolutions per gallons, or other rate. In this system, the output from the metering apparatus leads to a pulse divider 220 the purpose of which is to be described. A takeoff member 222 driven in a conventional manner from the vehicle shaft, such as for example the takeoff for a flexible cable 224 of a mechanically operated tachometer 226 or speedometer is enclosed in a housing 228. Takeoff member 222 has a magnet 230 secured thereon, and the interior of the housing 228 has a magnetic sensing or pickup device 132 with lead wires extending to the pulse divider 220.

Pulse divider 220 is of suitable electrical construction whereby to emit a resultant force to operate indicating means 110 comprising a digital tachometer or frequency counter. By feeding in gallons per hour from the metering apparatus 16 and feeding in miles per hour from the shaft output into divider 220, the resultant output displayed by the indicating means 110 will designate miles per gallon. It may also be desired to set the components of the system such that knots per gallon are displayed on the indicating means 110 whereby the system can be used on boats. The components may also be set such that the indicating means 110 will show shaft revolution of the engine per gallon of fuel consumed. Another counter 234 may be employed with the system which totalizes gallons of fuel used on revolutions of the engine shaft.

FIGS. 17 and 18 show alternative arrangements for picking up revolutions or other vehicle functions for assisting in establishing the rate through indicating means 110 in the form of a digital tachometer or frequency counter. In FIG. 17, for example, a magnet 238 is mounted on the flywheel 240 of the engine, and a magnetic sensing device 132 for feeding into a pulse conditioner of the type shown in previous embodiments is secured to the engine in an arrangement to operate the pulse conditioner each time the magnet passes it.

In FIG. 18, the magnetic sensing or pickup device 132 is mounted adjacent to the coil 242 of the engine, and such sensing device is operated by the electrical discharge of the coil so as to in turn actuate a pulse conditioner as in previous embodiments. By suitable alteration of the electrical components, the system can be adapted to an engine employing any number of pistons.

FIG. 19 illustrates a system of the invention as applied to multiple engines 10 which may be used at the same location or tested in the same area. Metering apparatuses 16 are installed in each fuel line 14 of the engines and the lead wires 140 from the metering apparatuses lead to a console or master unit 250 having pulse conditioners therein, not shown, equivalent to pulse conditioners 144 in other embodiments and having indicating or counter means 110 also as in other embodiments showing fuel usage.

A plurality of such indicating means 110 are shown in the console and each is adapted to be associated with an engine 10. Only three engines are shown for purposes of brevity. It is clear, however, that the console could monitor a number of engines equal in number to the indicating means 110. A totalizer 150 as in other embodiments is used with this system. The indicating means 110 if comprising a digital type read-out may be electrically associated with a selector switch 254 having suitable conventional selecting mechanism, not shown, and a dial whereby an operator can switch to any one of the outputs from the metering apparatuses to inspect the rate at any instant of fuel of any one engine. For example, the motors would be identified by numerals 1,2,3 etc. and be associated with a respective number on the dial for positive identification in switching to a respective engine. A recorder 256 of conventional structure is associated with the console and is driven by outputs from the metering apparatus or read-outs. Such recorder is arranged to record or otherwise make a record of functions shown on the read-outs 110 or 150. A recorder may be provided for each read-out if desired.

Figure 3:
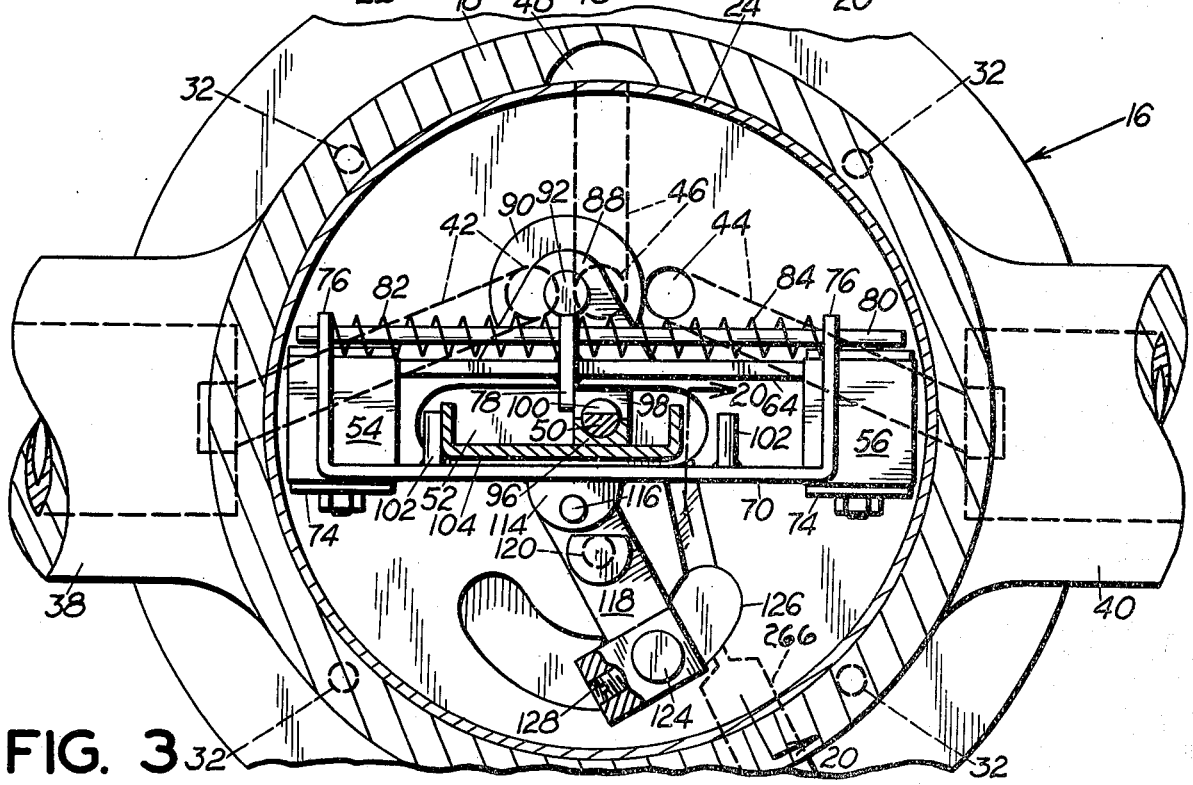
FIG. 3 is a horizontal sectional view of the metering apparatus taken on the line 3—3 of FIG. 2.

With reference to FIGS. 3 and 20, bleeding means 260 are provided in the metering apparatus 16 to bleed out trapped air in the cavities in the head 26. For such purpose, a stem 262 is threadedly supported in insert 264 in turn threadedly supported radially in housing 18 and projecting into a recess 266 in the head 26. A port 268 establishes communication between the recess 126 in the head and recess 266 and the inner end of recess 266 forms a seat for a ball valve 270 engageable in nonsealing arrangement with a slotted end 271 of stem 262, the said stem having a central bore 272 leading axially therethrough and having a suitable liquid-tight connection with a discharge hose 274. An O-ring seal 276 is provided between the inner end of stem 262 and the bottom of recess 266 and an O-ring seal 278 is provided between the stem 262 and the insert 264 the seal 278 being engageable between an inner surface of insert 264 and the bottom of a recess 280 in the peripheral surface of the stem 262. Recess 280 is slightly elongated to maintain a sealing engagement between the insert and stem while still allowing the stem to be backed out a short distance.

To bleed air from the cavities in head 26, it is merely necessary to back off stem 262 so that air can escape past ball valve 270 and out bore 272. This bleeding step may be accomplished during one or more cycles of the piston, and preferably the port 268 communicates with the deepest cavity in the head such as in magnet receiving recess 126 since trapped air will migrate to such deepest point.

It is to be understood that the forms of my invention herein shown and described are to be taken as preferred examples of the same and that various changes in the shape, size and arrangement of parts may be resorted to without departing from the spirit of my invention or the scope of the subjoined claims. For example, the readouts of the counters herein shown may be in the metric system. Also portions of embodiments shown herein may be used with other embodiments. For example, the pressure brake systems of FIGS. 12 and 13 as well as the temperature sensing means of FIG. 14 could as well be used with Diesel systems of the type shown in FIG. 10. Further, recorders such as those shown in FIGS. 1, 11, and 19 may be employed with other embodiments. Although the meter and systems employed herein are illustrated for use with fuel systems, it is clear that they may be used with other systems whether or not associated with fuel, and furthermore the invention is not limited for use with liquids since gases could be metered as well.

Having thus described my invention, I claim:

1. A flow meter for measuring fluid comprising a housing having a fluid compartment, movable measuring means in said fluid compartment arranged to be operated by the fluid flow, magnet means in said fluid compartment operably connected with said movable measuring means, an electric circuit, immovable magnetic pickup means in said circuit actuated by said magnet means and having an output, said pickup means being disposed remote from said fluid compartment but within the influence of said magnet means for actuation thereby, and indicating means responsive to the output of said pickup means indicating fluid flowing through said meter.

2. The flow meter of claim 1 including compensating means correcting the indications of said indicating means due to variations in temperature of the fluid.

3. The flow meter of claim 1 having means for connection into the fuel supply means of a combustion system and arranged to measure fuel consumed by the combustion system.

4. A flow meter for measuring fluids comprising a housing having a fluid compartment, movable measuring means in said fluid compartment arranged to be operated by the fluid flow, magnet means in said fluid compartment operably connected with said movable measuring means, an electric circuit, immovable magnetic pickup means in said circuit actuated by said magnet means and having an output, said pickup means being disposed remote from said fluid compartment but within the influence of said magnet means for actuation thereby, and recording means responsive to the output of said pickup means recording fluid flowing through said meter.

5. The flow meter of claim 4 having means for connection into the fuel supply means of a combustion system and arranged to measure fuel consumed by the combustion system.

6. A flow meter for measuring fluids comprising a housing having a fluid compartment, rotational measuring means in said fluid compartment arranged to be operated by the fluid flow, magnet means in said fluid compartment operably connected with said rotational measuring means, an electric circuit, immovable magnetic pickup means in said circuit actuated by said magnet means and having an output, said pickup means being disposed remote from said fluid compartment but within the influence of said magnet means for actuation thereby, and indicating means responsive to the output of said pickup means indicating fluid flowing through said meter.

7. The flow meter of claim 6 wherein said indicating means indicates the rate of fuel flowing through said meter.

8. The flow meter of claim 6 including compensating means correcting the indications of said indicating means due to variations in temperature of the fluid.

9. The flow meter of claim 6 including sensing means sensing the temperature of the fluid, and compensating means responsive to said sensing means correcting the output of said pickup means due to variations in temperature of the fluid.

10. The flow meter of claim 6 having means for connection into the fuel supply means of a combustion system and arranged to measure fuel consumed by the combustion system.

11. A flow meter for measuring fluids comprising a housing having a fluid compartment, rotational measuring means in said fluid compartment arranged to be operated by the fluid flow, magnet means in said fluid compartment operably connected with said rotational measuring means, an electric circuit, immovable magnetic pickup means in said circuit actuated by said magnet means and having an output, said pickup means bing disposed remote from said fluid compartment but within the influence of said magnet means for actuation thereby, and recording means responsive to the output of said pickup means recording fluid flowing through said meter.

12. The flow meter of claim 11 wherein said indicating means indicates the rate of fuel flowing through said meter.

13. The flow meter of claim 11 including compensating means correcting the recording of said recording means due to variations in temperature of the fluid.

14. The flow meter of claim 11 including sensing means sensing the temperature of the fluid, and compensating means responsive to said sensing means correcting the output of said pickup means due to variations in temperature of the fluid.

15. The flow meter of claim 11 having means for connection into the fuel supply means of a combustion system and arranged to measure fuel consumed by the combustion system.

16. A flow meter for measuring fluids comprising a housing having a fluid compartment, movable measuring means in said fluid compartment arranged to be operated by the fluid flow, magnet means in said fluid compartment operably connected with said measuring means, an electric circuit, immovable magnetic pickup means in said circuit actuated by said magnet means and having an output, said pickup means being disposed remote from said fluid compartment but within the influence of said magnet means for actuation thereby, sensing means sensing the temperature of the fluid, compensating means responsive to said sensing means correcting the output of said pickup means due to variations in temperature of the fluid, and indicating means responsive to the compensated output indicating the temperature compensated measurement of fluid flowing through the meter.

17. The flow meter of claim 16 having means for connection into the fuel supply means of a combustion system and arranged to measure fuel consumed by the combustion system.

18. A flow meter for measuring fluids comprising a housing having a fluid compartment, movable means in said fluid compartment arranged to be operated by the fluid flow, magnet means in said fluid compartment, an electric circuit, solid state magnetic pickup means in said circuit actuated by said magnet means and having an output, said pickup means being disposed remote from said fluid compartment but within the influence of said magnet means for actuation thereby, and indicating means responsive to the output of said pickup means indicating fluid flowing through said meter.

19. The flow meter of claim 18 wherein said meter comprises a slow flow meter.

20. The flow meter of claim 18 wherein said indicating means indicates the rate of fuel flowing through said meter.

21. The flow meter of claim 18 wherein said indicating means totalizes the amount of fuel flowing through said meter.

22. The flow meter of claim 18 including means recording the measurements of said meter.

23. The flow meter of claim 18 wherein said housing includes a second compartment separated from said fluid compartment by fluid impervious wall means, said magnetic pickup means being disposed in said second compartment.

24. The flow meter of claim 18 including sensing means sensing the temperature of the fluid, and compensating means responsive to said sensing means correcting the output of said pickup means due to variations in temperature of the fluid.

25. The flow meter of claim 18 arranged for use with a fuel measuring system for a vehicle driven by an internal combustion means and having a fuel supply, the vehicle having shiftable operating means, said measuring system including switch means in said circuit arranged to be operably movable to open and closed positions by said shiftable operating means and controlling said indicating means, said indicating means being responsive to a selected positioning of said switch in one of its positions to indicate fuel flowing through said meter.

26. The flow meter of claim 18 arranged for use with a fuel measuring system for a vehicle driven by an internal combustion means and having a fuel supply, the vehicle having shiftable operating means, said measuring system including switch means in said circuit arranged to be operably movable to open and closed positions by said shiftable operating means and controlling said indicating means, said indicating means being responsive to a selected positioning of said switch in one of its positions to indicate fuel flowing through said meter, and second indicating means responsive to said pickup means indicating total fuel flowing through said meter.

27. The flow meter of claim 18 arranged for use with a fuel measuring system for a vehicle driven by an internal combustion means and having a fuel supply, the vehicle having two sets of brakes, said measuring system including a pair of switch means in said circuit arranged to be operably movable to open and closed positions by respective brakes and controlling said indicating means, said indicating means being responsive to one or the other of said switch means.

28. The flow meter of claim 18 wherein said movable means comprises a cylinder and plunger assembly having reciprocative movement in said cylinder by fuel flowing through said housing, and adjustable stop means in said housing at each of the ends of the reciprocating movement of said plunger assembly, said stop means being adjustable to vary the limits of movement of said plunger.

29. The flow meter of claim 18 arranged for use with a fuel measuring system and a combustion means in which a portion of the fuel fed thereto is unburned and including a return line from the combustion means arranged to recirculate fuel back to the combustion means, and treatment means having means for connection in the measuring system.

30. The flow meter of claim 18 wherein said meter comprises an oscillating piston type meter.

31. The flow meter of claim 18 including valved air bleeder means leading from said fluid compartment to the exterior of said housing.

32. The flow meter of claim 18 having means for connection into the fuel supply means of a combustion system and arranged to measure fuel consumed by the combustion system.

33. A flow meter for measuring fluids, said flow meter comprising a housing having a fluid compartment, piston in said fluid compartment driven reciprocally by the flow of fluid through the meter, a fluid reversing snap action type valve operated by said piston, drive means operated by said piston, magnet means in said fluid compartment operated by said drive means, an electric circuit, immovable magnetic pickup means in said circuit actuated by said magnet means and having an output, said pickup means being disposed remote from said fluid compartment but within the influence of said magnet means for actuation thereby, and indicating means responsive to the output of said pickup means indicating fluid flowing through said meter.

34. The flow meter of claim 33 wherein said meter comprises a slow flow meter.

35. The flow meter of claim 33 wherein said indicating means indicates the rate of fluid flowing through said meter.

36. The flow meter of claim 33 wherein said indicating means totalizes the amount of fluid flowing through said meter.

37. The flow meter of claim 33 including means recording the measurements of said meter.

38. The flow meter of claim 33 wherein said housing includes a second compartment separated from said fluid compartment by fluid impervious wall means, said magnetic pickup means being disposed in said second compartment.

39. The flow meter of claim 33 including sensing means sensing the temperature of the fluid, and compensating means responsive to said sensing means correcting the output of said pickup means due to variations in temperature of the fluid.

40. The flow meter of claim 33 arranged for use with a fuel measuring system for a vehicle driven by an internal combustion means and having a fuel supply, the vehicle having shiftable operating means, said measuring system including switch means in said circuit arranged to be operably movable to open and closed positions by said shiftable operating means and controlling said indicating means, said indicating means being responsive to a selected positioning of said switch in one of its positions to indicate fuel flowing through said meter.

41. The flow meter of claim 33 arranged for use with a fuel measuring system for a vehicle driven by an internal combustion means and having a fuel supply, the vehicle having shiftable operating means, said measuring system including switch means in said circuit arranged to be operably movable to open and closed positions by said shiftable operating means and controlling said indicating means, said indicating means being responsive to a selected positioning of said switch in one of its positions to indicate fuel flowing through said meter, and second indicating means responsive to said pickup means indicating total fuel flowing through said meter.

42. The flow meter of claim 33 arranged for use with a fuel measuring system for a vehicle driven by an internal combustion means and having a fuel supply, the vehicle having two sets of brakes, said measuring system including a pair of switch means in said circuit arranged to be operably movable to open and closed positions by respective brakes and controlling said indicating means, said indicating means being responsive to one or the other of said switch means.

43. The flow meter of claim 33 including adjustable stop means in said housing at each of the ends of the reciprocating movement of said piston, said stop means being adjustable to vary the limits of movement of said piston.

44. The flow meter of claim 33 arranged for use with a fuel measuring system and a combustion means in which a portion of the fuel fed thereto is unburned and including a return line from the combustion means arranged to recirculate fuel back to the combustion means, and treatment means having means for connection in the measuring system.

45. The flow meter of claim 33 having means for connection into the fuel supply means of a combustion system and arranged to measure fuel consumed by the combustion system.

46. A flow meter arranged for use with an engine which produces output functions and which has fuel supply means, said flow meter comprising a housing having a fluid compartment, movable means in said fluid compartment arranged to be operated by the flow of fuel in the fuel supply means, magnet means in said fluid compartment, an electric circuit, solid state magnetic pickup means in said circuit actuated by said magnet means, said pickup means being disposed remote from said fluid compartment but within the influence of said magnet means for actuation thereby, means operative with said movable means providing influence of said magnet means on said pickup means, sensing means arranged to sense the engine functions, and means responsive to the measurement of the meter and said sensing means and arranged to provide an output comprising the amount of fuel used per unit of distance.

47. A flow metering system arranged for use with a combustion means having fuel supply means and in which a portion of the fuel fed thereto is unburned and including a return line from the combustion means arranged to return fuel back to the fuel supply means, said system comprising first and second flow meters one of which has means for connection in the fuel supply means of the combustion means and arranged to measure fuel supplied to the combustion means and the other of which has means for connection in the return line of the combustion means, at least one of said first and second meters comprising a housing having a fluid compartment, movable means in said fluid compartment arranged to be operated by the flow of fuel, magnet means in said fluid compartment, an electric circuit, solid state magnetic pickup means in said circuit actuated by said magnet means and having an output, said pickup means being disposed remote from said fluid compartment but within the influence of said magnet means for actuation thereby, the other of said first and second meters having a pickup output, means responsive to the pickup outputs of both meters arranged to provide a resultant which comprises the differential of said two pickup outputs, and indicating means responsive to said resultant arranged to indicate the differential of fuel flowing through said meters.

48. A flow metering system arranged for use with a combustion means having fuel supply means and in which a portion of the fuel fed thereto is unburned and including a return line from the combustion means arranged to return fuel back to the fuel supply means, said system comprising first and second flow meters one of which has means for connection in the fuel supply means of the combustion means and arranged to measure fuel supplied to the combustion means and the other of which has means for connection in the return line of the combustion means, at least one of said first and second meters comprising a housing having a fluid compartment, a piston in said fluid compartment driven reciprocally by the flow of fuel, a fluid reversing snap action type valve operated by said piston, drive means operated by said piston, magnet means in said fluid compartment operated by said drive means, an electric circuit, immovable magnetic pickup means in said circuit actuated by said magnet means and having an output, the other of said first and second meters having a pickup output, means responsive to the pickup outputs of both meters arranged to provide a resultant which comprises the differential of said two pickup outputs, and indicating means responsive to said resultant arranged to indicate the differential of fuel flowing through said meters.

49. A flow metering system arranged for use with at least two engines having fuel supply means, individual flow meters arranged for use with respective engine, each of said meters comprising a housing having a fluid compartment, movable means in said fluid compartment arranged to be operated by the flow of fuel in the fuel supply means of its respective engine, magnet means in said fluid compartments, an electric circuit, immovable magnetic pickup means in said circuit associated with each meter and being actuated by said magnet means, said pickup means having an output and being disposed remote from said fluid compartment but within the influence of said magnet means for actuation thereby, and selective indicating means for each of said meters responsive to the outputs of said respective pickup means to indicate fuel flowing through each of said meters.

50. A flow metering system arranged for use with a combustion means having fuel supply means and in which a portion of the fuel fed thereto is unburned and including a return line from the combustion means arranged to return fuel back to the fuel supply means, said system comprising first and second flow meters one of which has means for connection in the fuel supply means of the combustion means and arranged to measure fuel supplied to the combustion means and the other of which has means for connection in the return line of the combustion means, at least one of said first and second meters comprising a housing having a fluid compartment, movable measuring means in said fluid compartment arranged to be operated by the flow of fuel, magnet means in said fluid compartment, an electric circuit, immovable magnetic pickup means in said circuit actuated by said magnet means and having an output, said pickup means being disposed remote from said fluid compartment but within the influence of said magnet means for actuation thereby, the other of said first and second meters having a pickup output, sensing means sensing the temperature of the fuel, compensating means responsive to said sensing means and arranged to correct the output of said pickup means due to variations in temperature of the fuel, means responsive to the outputs of both pickup means at least one of which is compensated and arranged to provide a resultant which comprises the differential of said two pickup outputs, and indicating means responsive to said resultant arranged to indicate the compensated differential of fuel flowing through said meters.

* * * * *